(12) United States Patent
Hori

(10) Patent No.: US 7,095,517 B1
(45) Date of Patent: Aug. 22, 2006

(54) COMMUNICATION APPARATUS AND STORAGE MEDIUM

(75) Inventor: Masaaki Hori, Tajimi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/527,453

(22) Filed: Mar. 17, 2000

(51) Int. Cl.
*G06F 15/00* (2006.01)

(52) U.S. Cl. .................. 358/1.15; 358/1.16; 358/400; 358/402; 358/440; 358/442

(58) Field of Classification Search .............. 358/1.15, 358/402, 405, 440, 442, 1.16, 400
See application file for complete search history.

(56) References Cited

U.S. PATENT DOCUMENTS

| | | | | |
|---|---|---|---|---|
| 5,406,557 A | * | 4/1995 | Baudoin | 370/407 |
| 5,461,488 A | * | 10/1995 | Witek | 358/402 |
| 5,689,642 A | * | 11/1997 | Harkins et al. | 709/207 |
| 5,734,901 A | * | 3/1998 | Sidhu et al. | 712/220 |
| 5,862,202 A | * | 1/1999 | Bashoura et al. | 379/100.14 |
| 5,872,845 A | * | 2/1999 | Feder | 358/442 |
| 6,005,677 A | * | 12/1999 | Suzuki | 358/442 |
| 6,009,153 A | * | 12/1999 | Houghton et al. | 379/102.02 |
| 6,025,931 A | * | 2/2000 | Bloomfield | 358/402 |
| 6,061,502 A | * | 5/2000 | Ho et al. | 358/1.15 |
| 6,157,463 A | * | 12/2000 | Kitagawa | 358/400 |
| 6,157,706 A | * | 12/2000 | Rachelson | 379/100.08 |
| 6,374,291 B1 | * | 4/2002 | Ishibashi et al. | 709/206 |
| 6,411,393 B1 | * | 6/2002 | Wakasugi | 358/1.15 |
| 6,480,884 B1 | * | 11/2002 | Saito | 709/207 |
| 2002/0048040 A1 | * | 4/2002 | Kato | 358/1.15 |

FOREIGN PATENT DOCUMENTS

| | | |
|---|---|---|
| JP | A-5-37554 | 2/1993 |
| JP | A-5-68051 | 3/1993 |
| JP | A-6-104921 | 4/1994 |
| JP | A-8-23434 | 1/1996 |
| JP | A-9-307731 | 11/1997 |
| JP | A-10-93800 | 4/1998 |
| JP | A-10-150461 | 6/1998 |
| JP | A-10-307769 | 11/1998 |
| JP | 11-161568 A | 6/1999 |

* cited by examiner

*Primary Examiner*—David Moore
*Assistant Examiner*—Michael Burleson
(74) *Attorney, Agent, or Firm*—Oliff & Berridge, PLC (57) ABSTRACT

The invention provides a communication apparatus that broadcasts facsimile data by electronic mail (e-mail) on the Internet. In the communication apparatus, recipient's position information, and other broadcast recipient's disclosure information, can be included in a header of the e-mail to which facsimile data is attached, according to the recipients' e-mail addresses. With such information included in the header of the e-mail, the facsimile data attached to the e-mail can be broadcast to a plurality of recipients, so as to meet the various sender's usage patterns, while effectively using functions unique to e-mail.

18 Claims, 6 Drawing Sheets

COMMUNICATION APPARATUS AND STORAGE MEDIUM

BACKGROUND OF THE INVENTION

1. Field of the Invention

The invention relates to a communication apparatus capable of broadcasting image data, such as facsimile data, by electronic mail, via the Internet, to a storage medium that stores programs for controlling the communication apparatus.

2. Description of the Related Art

With the rapid expansion of the Internet, various communication apparatus for operating with electronic mail (hereinafter referred to as "e-mail") are currently being developed, besides personal computers.

In such communication apparatus, a facsimile apparatus is provided that is capable of carrying out communications, via the Internet. The facsimile apparatus may broadcast image data, such as facsimile data, by e-mail. Broadcasting is a communication method where one piece of data is sent out, to a plurality of recipients designated by a user, at substantially the same time.

Specifically, to broadcast the facsimile data obtained by reading an original document with the above-constructed facsimile apparatus, one piece of e-mail to which the facsimile data is affixed or attached, is sent out only one time to a predetermined Internet server having a mail server (at an access point). One piece of the e-mail has header information including recipients' e-mail addresses (broadcast e-mail addresses) designated by a user. The e-mail, sent out from the facsimile apparatus to the Internet server, is transmitted from the Internet server to each of the recipients having a respective e-mail address.

When the facsimile apparatus broadcasts the facsimile data, via a public telephone line only, the facsimile apparatus has to repeatedly conduct the data transmission for each of the recipients, by opening and closing the circuit with the public telephone line every time the facsimile data is transmitted. On the contrary, when the facsimile apparatus broadcasts the facsimile data by e-mail, the data is effectively transmitted to a plurality of recipients by sending one piece of e-mail only one time to an Internet server at a local access point to which the users have access under contract.

However, while effectively using the above-described function which is unique to e-mail, the above-described conventional facsimile apparatus for operation with e-mail cannot broadcast the facsimile data attached to the e-mail with the information as to whether a recipient of the e-mail has to respond to the facsimile data given to the recipient. The information, as to whether a recipient of the e-mail has to respond to the facsimile data, is the information that indicates whether: (1) the recipient is a main recipient (listed in the "TO" header line) to whom the e-mail is addressed and who should respond or react to the facsimile data attached to the e-mail; (2) the recipient is an additional recipient (listed in the "CC" (Carbon Copy) header line) who will just look over the facsimile data and will not need to respond or react to the facsimile data; or (3) the recipient is an additional recipient of the e-mail (listed in the "BCC" (Blind Carbon Copy) header line) who will not be shown to "TO" and "CC" recipients, nor other "BCC" recipients, and who will just look over the facsimile data. A recipient (listed in the "TO" header line) of an ordinary business facsimile letter, often has to respond or react to the facsimile letter, regardless of whether the recipient have to send a reply to the sender of the facsimile letter. On the contrary, the "CC" or "BCC" recipients of the facsimile letter are not often required to actively respond to the sender of the facsimile letter.

When the conventional facsimile apparatus sends out the facsimile data by e-mail, all the broadcast e-mail addresses are disclosed to a recipient by a header information included in the e-mail. However, the disclosure of all the broadcast e-mail addresses is not convenient when a sender would like to not disclose a broadcast e-mail address (for example, when the disclosure of the "TO" and "CC" recipients to the "BCC" recipients is acceptable, but the disclosure of the "BCC" recipients to the "TO" and "CC" recipients is not acceptable). To satisfy such a sender's request when the facsimile data is broadcast by e-mail, the e-mail has to be transmitted separately to the broadcast e-mail addresses, i.e., the e-mail addresses which are not shown to other recipients and the e-mail addresses which are shown to other recipients. Such broadcasting does not effectively use the above-described function that is unique to e-mail.

SUMMARY OF THE INVENTION

One aspect of the invention is to provide a communication apparatus that broadcasts facsimile data while effectively using functions that are unique to e-mail, so as to meet the various sender's usage patterns. Another aspect of the invention is to provide a storage medium that stores programs for controlling the communication apparatus.

According to one aspect of the invention, a communication apparatus transmits facsimile data by attaching the facsimile data to electronic mail (e-mail) for use with an information network. The communication apparatus may include a recipient's information inputting device that inputs information of a recipient to whom the e-mail is transmitted, a position information inputting device that inputs information of a recipient's position for the recipient's information input by the recipient's information inputting device, and that correlates the position information to the recipient's information, and a transmission device that transmit the facsimile data by attaching the facsimile data to the e-mail, based on the recipient's information input by the recipient's information inputting device and the position information input by the position information inputting device.

In the communication apparatus, the information of a recipient's position, that is, the information indicating whether or not a response to the facsimile data is required by the recipient, is indicated to the recipient of the e-mail to which the facsimile data is attached. The facsimile data can be transmitted, with functions unique to e-mail being effectively used, while meeting the various sender's requests when the response is required and when it is not required.

According to another aspect of the invention, a communication apparatus broadcasts, to a plurality of recipients, facsimile data by attaching the facsimile data to electronic mail (e-mail) for use with an information network. The communication apparatus may include a recipient's information inputting device that inputs pieces of the recipient's information for one piece of the e-mail to be transmitted, a disclosure information inputting device that inputs disclosure information as to whether or not disclosure of other broadcast recipients is required, according to the pieces of the recipient's information input by the recipient's information inputting device, and that correlates the disclosure information to the recipient's information, and a transmission device that transmits the facsimile data to be broadcast by attaching the facsimile data to the e-mail, based on the pieces of the recipient's information input by the recipient's information inputting device and the disclosure information input by the disclosure information inputting device.

In the communication apparatus, other broadcast recipients may or may not be disclosed, according to the recipients of the e-mail to which the facsimile data is attached. The facsimile data can be broadcast, with functions unique to e-mail being effectively used, while meeting the various sender's requests when the disclosure of another broadcast recipient is required and when it is not required.

BRIEF DESCRIPTION OF THE DRAWINGS

Preferred embodiments of the present invention will be described in detail with reference to the following figures wherein.

Further objects, details, and advantages of the invention will be apparent from the following detailed description, when read in conjunction with the drawings.

DETAILED DESCRIPTION OF PREFERRED EMBODIMENTS

A preferred embodiment of the invention will be described in detail with reference to the figures.

Figure 1:
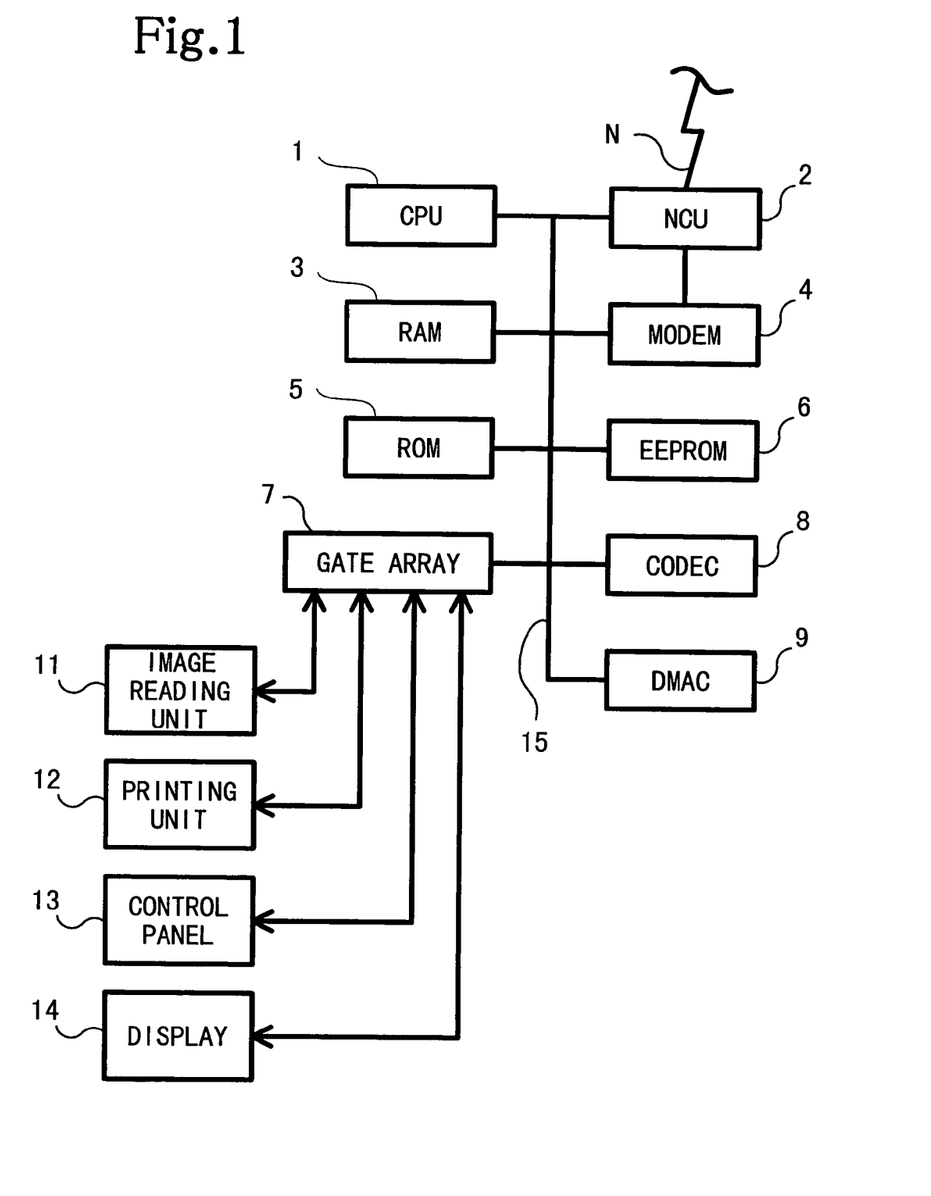
FIG. 1 is a block diagram of facsimile apparatus in a communication apparatus according to an embodiment of the invention.

FIG. 1 is a block diagram of facsimile apparatus in a communication apparatus according to an embodiment of the invention. The facsimile apparatus are explained below, with emphasis placed on a function of broadcasting facsimile data by e-mail on the Internet.

As shown in FIG. 1, the facsimile apparatus includes the following components: a central processing unit (CPU) 1; a network control unit (NCU) 2; a random-access memory (RAM) 3; a modem 4; a read-only memory (ROM) 5; an electrically erasable programmable read-only memory (EEPROM) 6; a gate array 7; a CODEC 8; a direct memory access controller (DMAC) 9; an image reading unit 11; a printing unit 12; a control panel 13; and a display 14. The CPU 1, the NCU 2, the RAM 3, the modem 4, the ROM 5, the EEPROM 6, the gate array 7, the CODEC 8, and the DMAC 9 are connected with each other by a bus line 15. The bus line 15 includes an address bus, a data bus, and a control signal line. The image reading unit 11, the printing unit 12, the control panel 13, and the display 14 are connected to the gate array 7.

The CPU 1 controls the operations of the facsimile apparatus. The NCU 2, which is connected to a public telephone line N, performs the network controls. The backup battery of the RAM 3 may be, for example, a charging battery, and the RAM 3 provides space for the operations by the CPU 1 and for storing various kinds of data. The modem 4 modulates and demodulates facsimile data. The ROM 5 stores various kinds of programs and data, such as setting values. The EEPROM 6 stores various kinds of flags and setting data. The gate array 7 functions as an input/output interface of the CPU 1. The CODEC 8 encodes and decodes the facsimile data. The DMAC 9 writes data into, and reads data from, the RAM 3.

The image reading unit 11 reads, from an original document, an image to be sent. The printing unit 12 reproduces the image, received from an external communication apparatus or that obtained by the image reading unit 11, onto a recording paper, by a printing device of, for example, an ink-jet type or a thermal transfer type.

Figure 5A:
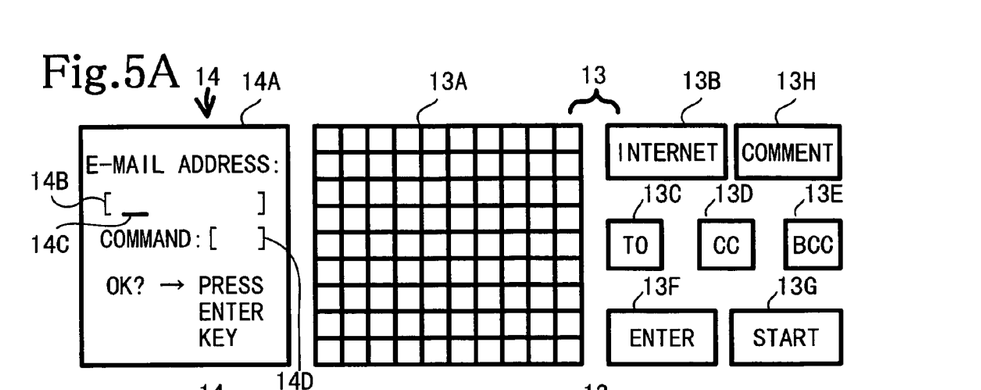
FIG. 5A is a detailed schematic of a control panel and a display of the facsimile apparatus according to one embodiment of the invention.

The control panel 13, as shown in, for example FIG. 5A, has various keys 13A including ten-numbered keys and character keys, that convey to the CPU 1, a signal input by a user's key operation as is needed. The various keys 13A are hereinafter collectively referred to as the character input keys 13A. The character input keys 13A also include an abbreviated dialing key. The control panel 13 is further provided with an Internet key 13B, a "TO" command key 13C, a "CC" command key 13D, a "BCC" command key 13E, an enter key 13F, a start key 13G, and a comment key 13H. The display 14 is provided with a display or an indicator, for example, a liquid crystal display (LCD) or a liquid-emitting diode (LED) to display various information under the control of the CPU 1. In this embodiment, as shown in, for example, FIG. 5A, an LCD 14A is provided. The LCD 14A shows a recipient's e-mail address input by a user, and a command of "TO", "CC", or "BCC" in association with the e-mail address.

Figure 2:
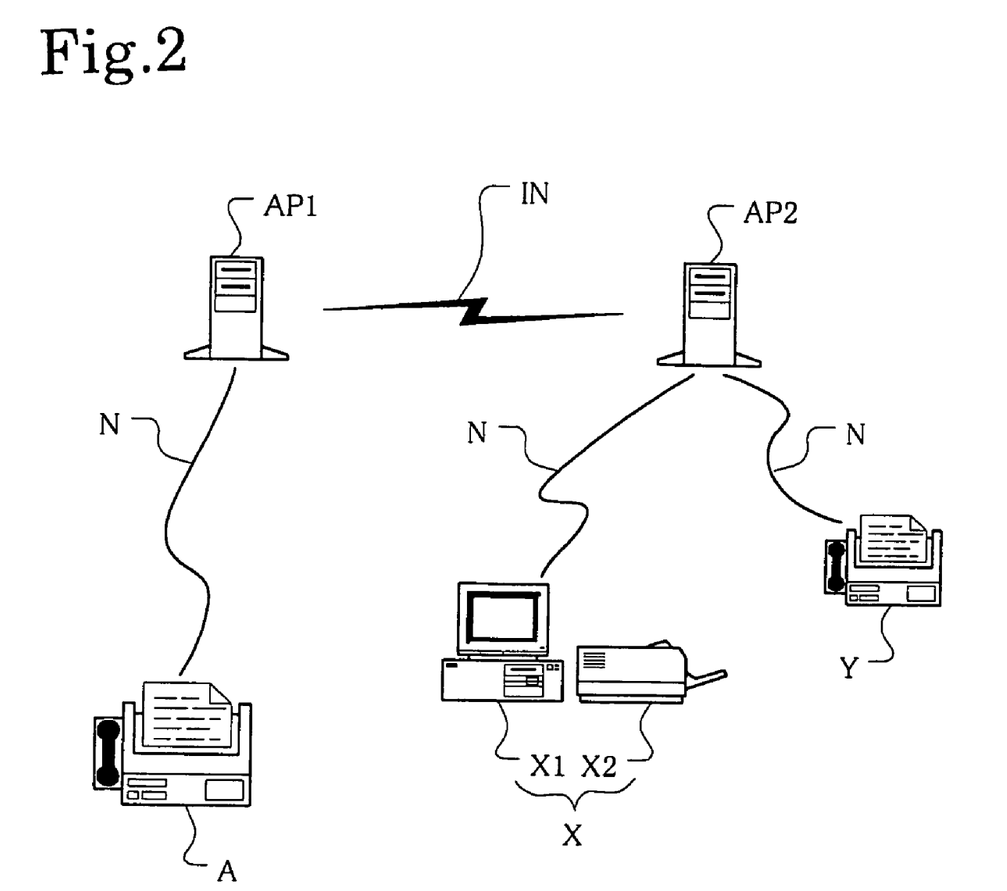
FIG. 2 is a conceptual illustration of the facsimile apparatus connected to the Internet.

FIG. 2 illustrates the facsimile apparatus connected to the Internet. As shown in FIG. 2, the facsimile apparatus A, according to the embodiment, can physically be connected to an Internet server at an access point AP1, via the public telephone line N. A personal computer system X and a facsimile apparatus Y, as a receiver side apparatus, can physically be connected to an Internet server at an access point AP2, via the public telephone line N. The information system based on the communication networks, such as between the access points AP1 and AP2, is referred to as the Internet IN. Digital information can be exchanged throughout the world across the Internet IN with reduced communication costs, by paying costs of a telephone call, via the public telephone line N, to an access point, for example, AP1 or AP2. Other than the ordinary functions of facsimile transmission and reception performed via the public telephone line N, the facsimile apparatus A can broadcast facsimile data by e-mail on the Internet IN, at a relatively low cost.

Specifically, when the facsimile data is ordinarily transmitted or received, only via the public telephone line N, communications costs may increase based on the distance to where the telephone call is made and the differences of countries to which the telephone call is made. However, when the facsimile data is transmitted or received over the Internet IN, the sender will only pay the costs of communication made, via the public telephone line N, up to an local access point, for example AP1 or AP2, so that the communication costs can be reduced.

The access points AP1, AP2 are run by an Internet service provider or an Internet access provider who provides a connection to the Internet IN. When e-mail is transmitted or received, via the Internet IN, an Internet server at the access points AP1, AP2 performs the transmission or the reception of the e-mail. The Internet server can function as a mail server.

When transmitting or receiving e-mail, a user of the facsimile apparatus A needs access to the mail server. Addresses used for the transmission or reception of e-mail are managed in the mail server by the e-mail addresses assigned to users. Mailboxes for storing incoming e-mail according to the e-mail addresses are secured in an external storage device of the mail server. For example, when the mail server at the access point AP1 receives e-mail transmitted from the facsimile apparatus A, the mail server transfers the e-mail to a mail server at the access points AP1 or AP2, designated by the e-mail address. The receiver-side personal computer system X cannot obtain the e-mail transmitted from the facsimile apparatus A, unless the personal computer system X accesses the mail server at the access point AP2.

In this embodiment, the access point AP2 transmits only the facsimile data even though it is attached to e-mail. Therefore, the facsimile apparatus Y, having only ordinary facsimile transmission and reception functions, can receive the facsimile data attached to e-mail, as will be described below. The sender and the receiver may access the same access point. However, the embodiment will be explained based on the access point to which the facsimile apparatus A accesses, which is different from the access point that the personal computer system X and the facsimile apparatus Y access to, as shown in FIG. 2.

The personal computer system X may be a combination of a computer X1 and a printer X2 of a peripheral device. On the personal computer system X, programs including, for example, e-mail transmission and reception, can be run. The facsimile apparatus Y may be a different type of facsimile apparatus from the facsimile apparatus A, such as having only ordinary functions to transmit and receive facsimile, or the same type as the facsimile apparatus A, such as having functions to transmit and receive facsimile and e-mail, as well. In the embodiment, the facsimile apparatus Y is the former type, such as having only ordinary functions to transmit and receive facsimile. It is to be noted that the structures and operations of the personal computer system X and the facsimile apparatus Y have been known, and a detailed explanation thereof is omitted.

Figure 3:
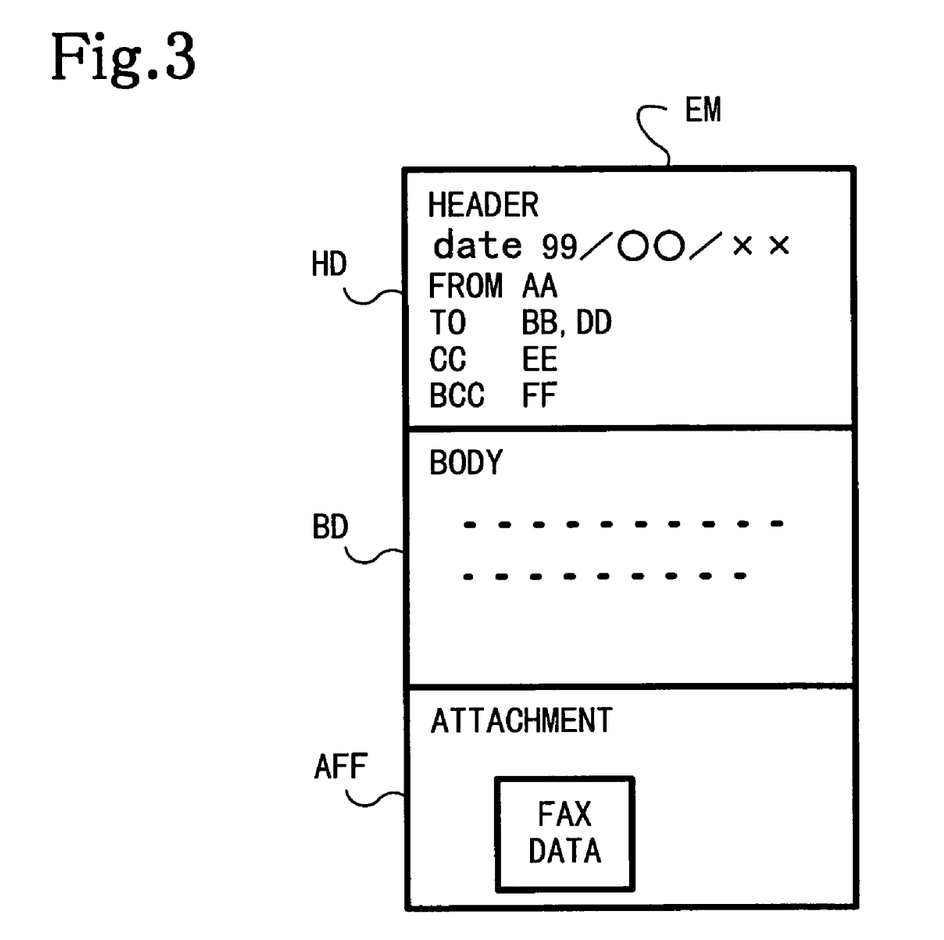
FIG. 3 is a conceptual illustration of the structure of e-mail, to be transmitted or received, via the Internet, shown in FIG. 2.

FIG. 3 illustrates the structure of e-mail to be transmitted or received, via the Internet shown in FIG. 2. As illustrated in FIG. 3, e-mail EM has a header HD, a body BD, and an attachment AFF. The header HD includes a different piece of information about the e-mail EM, such as the day and time it was sent, sender's e-mail address AA, as well as the recipients' e-mail addresses BB, DD, EE, and FF. The body BD of the e-mail EM is the area where the character information is written. For the transmission of the facsimile data by e-mail, character information is not necessarily entered in the body BD. An attachment or affixed data AFF may be transmitted along with an e-mail message in the body BD. When the facsimile apparatus A, according to the embodiment, transmits the facsimile data by e-mail, the data is transmitted as an attachment or affixed data AFF.

The main aspects of the invention will be briefly explained below. When the facsimile apparatus A broadcasts the facsimile data obtained by reading an original document to, for example, the personal computer system X and the facsimile apparatus Y, via the Internet IN, the facsimile apparatus A generates the facsimile data as the data to be attached to the e-mail EM, according to the e-mail EM format. The thus generated facsimile data is transmitted by e-mail to the access point AP1. To transmit the e-mail EM, the user of the facsimile apparatus A designates a plurality of broadcast e-mail addresses. At this time, included in the header HD of the e-mail EM, is information, for example, as to whether the recipient of e-mail is a main recipient and needs to respond or react to the facsimile data, and whether the disclosure of other broadcast e-mail addresses is required, according to the e-mail addresses assigned to each of the recipients.

As shown in FIG. 3, when the e-mail addresses of BB and DD are written as recipients of the e-mail EM in "TO" command line in the header HD of the e-mail EM, the sender having the e-mail address AA implies that the sender would like to the recipients having the e-mail addresses BB and DD, to respond or react to the facsimile data attached to the e-mail EM. When each of the recipients, having the e-mail addresses of BB and DD, receives the e-mail EM, the recipients may understand that they are the main recipients of the e-mail EM, since their e-mail addressees BB and DD are listed in the "TO" command line. In the e-mail EM received by the recipients having the e-mail addresses of BB and DD, other broadcast e-mail address, for example, the e-mail address EE in "CC" command line, will be indicated. In this case, the e-mail EM received by the recipient having the e-mail address BB, includes other broadcast e-mail addresses of DD and EE, along with the e-mail address BB. The e-mail EM received by the recipient, having the e-mail address EE, includes other broadcast e-mail addresses of BB and DD, along with the e-mail address EE. However, the e-mail address FF in the "BCC" command line is not shown to each of the recipients having the e-mail address BB and DD.

When the e-mail address of EE is written in the "CC" command line in the header HD of the e-mail EM, other broadcast e-mail addresses BB and DD will be indicated in the e-mail EM received by the recipient having the e-mail address EE. However, the e-mail address FF in the "BCC" command line is not shown to the recipient having the e-mail address EE. The recipient having the e-mail address EE may understand that the e-mail EM is transmitted from the sender, having the e-mail address AA, to the recipient, having the e-mail address EE as an additional recipient. Therefore, the recipient, having the e-mail address EE, may understand that the recipient does not have to actively respond to the facsimile data attached to the e-mail EM.

Thus, it is not disclosed, to the "TO" and "CC" recipients, that the same e-mail EM is transmitted to the e-mail address FF listed in the "BCC" command line.

When the e-mail address of FF is written in the "BCC" command line in the header HD of the e-mail EM, the e-mail address FF will not be listed in the "TO" or "CC" command lines in the e-mail EM received by the recipient having the e-mail address FF. Therefore, the recipient, having the e-mail address FF, may understand that the recipient is the "BCC" recipient and does not have to actively respond to the facsimile data attached to the e-mail EM. In the e-mail EM received by the recipient, having the e-mail address FF, all the broadcast e-mail addresses listed in the "TO" and "CC" lines, for example, BB, DD, and EE, are disclosed, so that the recipient, having the e-mail address FF, may understand that the "TO" and the "CC" recipients of the e-mail EM sent by the sender have the e-mail address AA. However, when the sender, having the e-mail address AA, sends the e-mail EM to a "BCC" recipient other than the e-mail address FF, another "BCC" recipient is not disclosed to the recipient having the e-mail address FF.

The CPU 1 of the facsimile apparatus A writes in the header HD a command that meets the user's needs, for each of e-mail addresses designated by the user. Before the e-mail EM transmission, character information, such as a message, according to the user's key input, can be written into the body BD, under the control of the CPU 1.

When the facsimile apparatus A transmits the e-mail EM to the access point AP1, while meeting the various requirements of the sender, the access point AP1 receives the e-mail EM. Then, the access point AP1 is connected to, for example, the access point AP2 as designated by the e-mail addresses, via the Internet IN. In each of the mailboxes at the access point AP2, the e-mail EM is posted. After the e-mail EM is posted in the mailboxes, the recipients BB, DD, EE, and FF corresponding to the personal computer system X or the like, can obtain the e-mail EM from the respective mailbox, by accessing to the access point, for example, AP2. By obtaining the e-mail EM, the facsimile data attached to the e-mail EM can be read.

To enable the transmission of the facsimile data, which is attached to the e-mail EM, to other facsimile apparatus, such as, for example, the facsimile apparatus Y, the sever at the access point AP2 supports such a function that only the facsimile data is extracted from the e-mail EM and transmitted. At the access point AP2, a service to disclose information, included in the header HD of the e-mail EM to recipients, is not provided. Therefore, only the facsimile data is transmitted to, for example, the facsimile apparatus Y. When only the facsimile data is transmitted, the data in the header HD and the body BD is ignored. Therefore, the facsimile apparatus Y may receive the facsimile data, similar to receiving the facsimile data ordinarily transmitted from facsimile apparatus, only via the public telephone line N.

A user of the facsimile apparatus Y will not be able to recognize if the facsimile data is transmitted to the user using any one of "TO", "CC", or "BCC" command. The user also does not know to whom the facsimile is sent by the sender that has the e-mail address AA, other than the user of the facsimile apparatus Y. However, if the service to disclose information, included in the header HD of the e-mail EM to recipients, is provided at the access point AP2, the facsimile apparatus Y may receive the facsimile data and the information in the header HD. With the information in the header HD, a user of the facsimile apparatus Y can recognize that the facsimile data is transmitted to the user using one of "TO", "CC", or "BCC" command. The user also can understand to whom the facsimile is sent by the sender, having the e-mail address AA, except for the "BCC" recipients.

The operations of the facsimile apparatus A having the above-described constructions, specially, the operation of broadcasting the facsimile data to a plurality of recipients, will be explained with reference to the figures.

Figure 4:
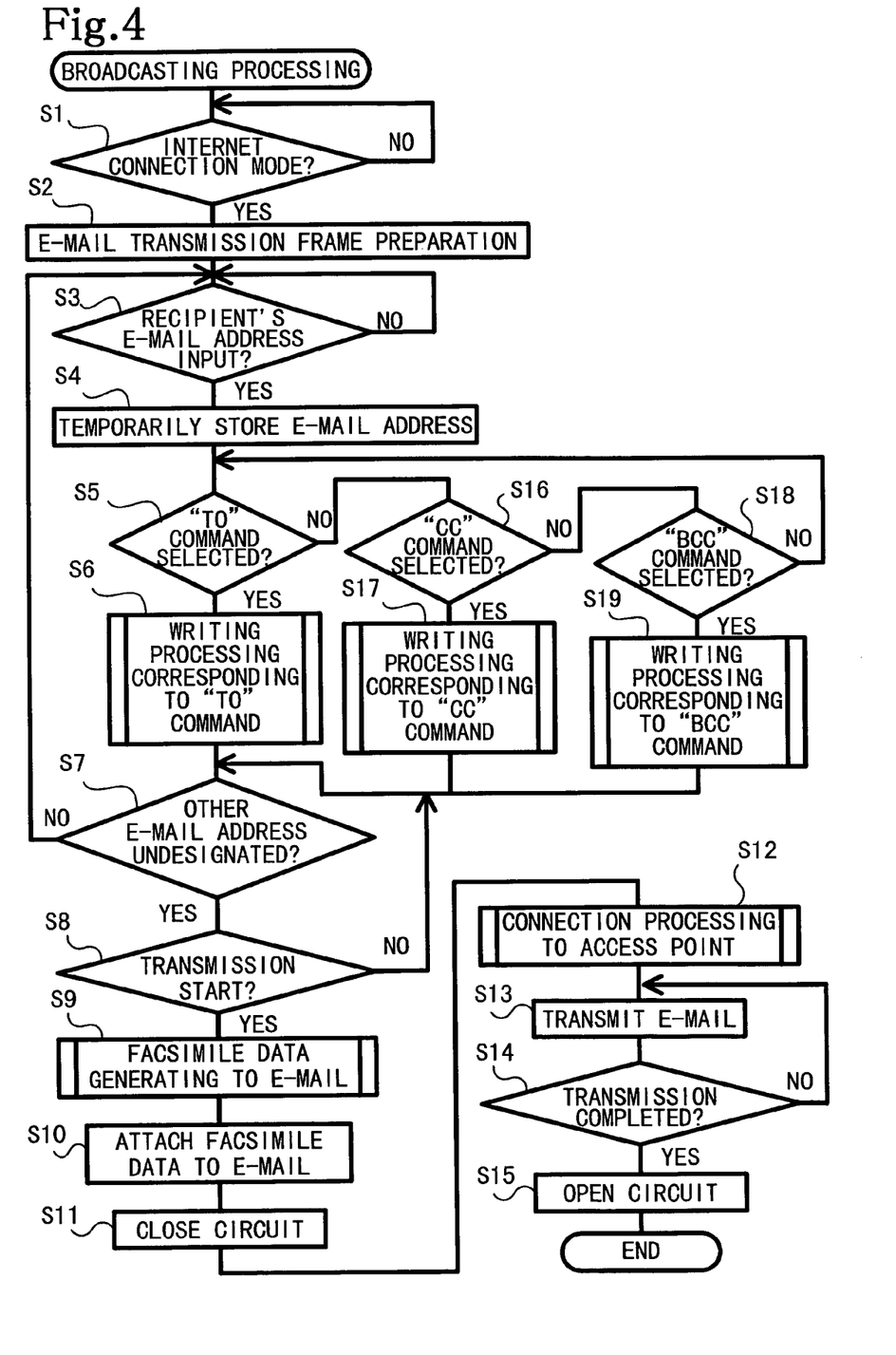
FIG. 4 is a flowchart illustrating a processing of facsimile data broadcasting by e-mail.

FIG. 4 is a flowchart illustrating a processing of broadcasting facsimile data. FIG. 5A is a detailed schematic of the control panel 13 and the display 14 of the facsimile apparatus A. As shown in FIG. 4, the CPU 1 first determines whether an Internet connection mode is selected by a user (S1), to start the broadcasting processing. In this embodiment, the determination in S1 is made, by the CPU 1, as to whether the Internet key 13B shown in FIG. 5A is pressed. However, selection of the Internet connection mode is not limited by the Internet key 13B, and may alternatively be performed in a different manner if the Internet connection is ensured. If the Internet connection mode is selected (S1: YES), the CPU 1 prepares an e-mail transmission frame in the RAM 3 (S2). The e-mail transmission frame refers to the unit of storage for collectively transmitting the data in the header HD, the body BD, and the attachment AFF, as shown in FIG. 3.

The CPU 1 then determines whether an e-mail address, that designates a destination or a recipient, is input by the user (S3). The e-mail address will be input by the user using the character input keys 13A on the control panel 13. As described above, the character input keys 13A include an abbreviated dialing key. If the user registers an e-mail address in the EEPROM 6 in advance, the e-mail address may be input by pressing one of the character input keys 13A, or a few keys in accordance with the so-called abbreviated dialing is made.

When the e-mail address is input, that is, when the user inputs one of the broadcast e-mail addresses using the character input keys 13A, the CPU 1 shows the input e-mail address in the LCD 14A of the display 14. Thereafter, when the user presses the enter key 13F (S3: YES), and the CPU 1 temporarily stores the e-mail address in the RAM 3 (S4). In this case, the input e-mail address is sequentially shown in an e-mail address indication area 14B at the position where a cursor 14C is located.

After the input of the e-mail addresses, the CPU 1 determines whether the "TO" command is selected by the user (S5). In this embodiment, the determination in S5 is made, by the CPU 1, as to whether the "TO" key 13C is pressed. When the "TO" command is selected, that is, when the user presses the "TO" key 13C and then the enter key 13F with the "TO" indicated on a command indication area 14D in the LCD 14A (S5: YES), the CPU 1 performs a writing processing to write the header HD information corresponding to the "TO" command in the e-mail EM transmission frame prepared in the RAM 3 (S6). Unlike the above-described sequence, any one of "TO", "CC", or "BCC" command may first be selected and entered. E-mail addresses input after the command selection may all correspond to the selected command. The command selection manner in this embodiment is not limited to "TO" command, but it can be applied to other "CC" and "BCC" commands.

After finishing writing the header HD information corresponding to the "TO" command, the CPU 1 controls the display 14 to show a message, for example, "OTHER E-MAIL ADDRESS INPUT?", so that the user can understand that the other e-mail address input is acceptable. Then, the CPU 1 determines whether the other e-mail address is input (S7). When other e-mail address is undesignated (S7: YES), the CPU 1 determines whether the start key 13G, to start the transmission of the facsimile data, is pressed by the user (S8).

When the start key 13G is pressed and the transmission start is requested by the user (S8: YES), the CPU 1 performs a facsimile data generating processing (S9), wherein the CPU 1 controls the image reading unit 11 to read the images on the original document, and generates facsimile data from the image data obtained as a result of reading, so as to meet the e-mail EM format. The user may include character information, such as a message directed to a recipient, in the body BD of the e-mail EM transmission frame. The images on the original document may be read before an e-mail address is input.

The CPU 1 attaches the thus generated facsimile data, and the e-mail EM transmission frame is completed (S10).

When the e-mail EM transmission frame is completed, the CPU 1 controls the NCU 2 to close the circuit with the public telephone line N (S11). Subsequently, the CPU 1 performs a predetermined connection processing to connect to the access point AP1 (S12). At this time, the CPU 1 reads out the information to connect to the access point AP1, such as the sender's ID and password stored in the EEPROM 6, and sends out such information to the access point AP1.

As it is connected to the Internet IN with the approval of the access point AP1, the CPU 1 starts transmitting the e-mail EM to which the facsimile data is attached (S13).

Accordingly, the server at the access point AP1 stores the transmitted e-mail EM containing the header HD including the various commands, the body BD that may have the character information written therein, and the attachment AFF of the facsimile data.

After starting transmitting the e-mail EM, the CPU 1 determines whether the transmission of the e-mail EM is completed, until the CPU 1 receives, from the access point AP1, a signal indicating that the reception of the e-mail EM is completed (S14).

When the transmission of the e-mail EM is completed and the CPU 1 receives from the access point AP1 the signal indicative of e-mail EM reception completion (S14: YES), the CPU 1 controls the NCU 2 to open the circuit with the public telephone line N (S15). A sequence of the broadcasting processing is then finished.

The e-mail EM received at the access point AP1 is broadcast to each of recipients, with the contents written in the e-mail EM changed according to recipients, based on the information in the header HD ("TO", "CC", and "BCC" command and e-mail address listed in the "TO", "CC", and "BCC" lines). In S14, when the transmission of the e-mail EM is not completed (S14: NO), the flow returns to S13 where the CPU 1 continues to transmit the e-mail EM.

In S8, when the transmission start is not requested by the user, that is, the start key 13G is not pressed (S8: NO), the flow returns to S7 where the CPU 1 repeatedly determines whether other e-mail address is input or undesignated. In S7, when other e-mail address is not undesignated (S7: NO), the flow returns to S3, where the CPU 1 waits for the user to input other e-mail address.

In S5, when the "TO" command is not selected (S5: NO) but "CC" command is, that is, when the user presses the "CC" key 13D and presses the enter key 13F with the "CC" indicated on the command indication area 14D in the LCD 14A (S16: YES), the CPU 1 performs a writing processing for the e-mail address temporarily stored in S4, to write the header HD information corresponding to the "CC" command in the e-mail EM transmission frame prepared in the RAM 3 (S17). Upon the completion of the header HD information writing for the "CC" command, the flow proceeds to S7, as the flow proceeds to that step (S7) after the completion of the header HD information writing for the "TO" command in S6.

In S16, when the "CC" command is not selected (S16: NO) but "BCC" command is, that is, when the user presses the "BCC" key 13E and presses the enter key 13F with the "BCC" indicated on the command indication area 14D in the LCD 14A (S18: YES), the CPU 1 performs a writing processing for the e-mail address temporarily stored in S4, to write the header HD information corresponding to the "BCC" command in the e-mail EM transmission frame prepared in the RAM 3 (S19). Upon the completion of the header HD information writing for the "BCC" command, the flow proceeds to S7, as the flow proceeds to that step (S7) after the completion of the header HD information writing for the "CC" command in S17.

In S18, when the "BCC" command is not selected (S18: NO), the CPU 1 returns to S5 and waits for the user to select and enter a command.

In S3, when an e-mail address is not input (S3: NO), the CPU 1 repeats the determination in S3 until an e-mail address is input. If any e-mail address has not been input after a predetermined time has elapsed, the broadcasting processing may be terminated.

In S1, when the Internet connection mode is not selected (S1: NO), the CPU 1 is placed in the stand-by state without starting a series of operations for broadcasting the facsimile data.

In the sender-side facsimile apparatus A, the steps "S5 and S6", "S16 and S17", and "S18 and S19" can be repeatedly conducted for a plurality of e-mail addresses, so that a command according to each of e-mail addresses can be selected. As the respective command for each of the e-mail addresses is accepted, the e-mail EM, to which the facsimile data is attached, is transmitted and posted in the respective mailboxes at the access points, for example, AP2 designated by the e-mail addresses, via the mail server at the access point AP1 and the Internet IN. The recipients, for example, the personal computer system X, can read the facsimile data by accessing to the access point AP2 and obtaining the e-mail addressed to the recipient of the personal computer system X. The thus obtained e-mail EM shows other broadcast e-mail addresses and indicates whether the recipients need to respond to the facsimile data, according to the commands selected by the sender.

Figure 6:
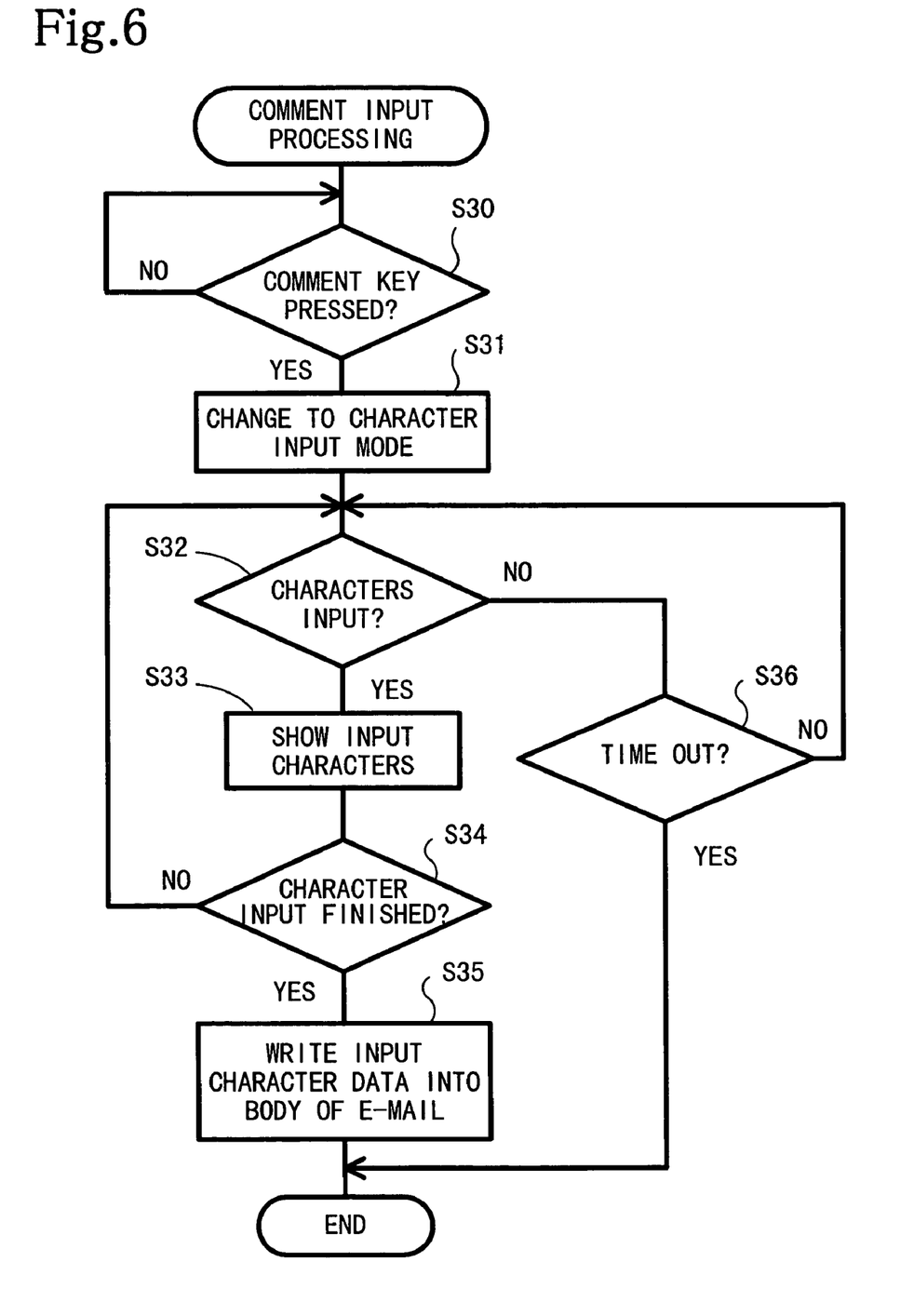
FIG. 6 is a flowchart illustrating a comment input processing.

While the broadcasting processing, shown in FIG. 4, is being executed, the facsimile apparatus A monitors whether the comment key 13H provided on the control panel 13 is pressed. When it is detected that the comment key 13H is pressed, an interrupt, as shown in the flowchart in FIG. 6, is handled. At this time, various information that was previously input and shown in the display 14, is temporarily stored in the RAM 3. In the LCD 14A of the display 14, a screen for inputting the comment or message will appear. A relatively small display device, provided on the facsimile apparatus A, can be effectively used by handling the thus programmed interrupt. With reference to the flowchart shown in FIG. 6, the processing, that occurs when the comment key 13H is pressed, will be described below.

FIG. 6 is a flowchart illustrating a comment input operation. As shown in FIG. 6, the CPU 1 monitors whether the comment key 13H is pressed by the user before step S9 in the broadcasting processing shown in FIG. 4 (S30), since the comment needs to be input before the CPU 1 performs the facsimile data generating processing in S9. In S30, monitoring is conducted with a certain timing, for example, for a time slice, by the CPU 1 that handles the interrupt.

When the comment key 13H is pressed (S30: YES), the CPU 1 changes the input mode in the display 14, serving as the operation panel, to a character input mode (S31). The character input mode is the mode in which, for example, alphabetic, numerical, or kana (Japanese characters) may be input.

When the user inputs characters (S32: YES), the CPU 1 shows the corresponding characters on the LCD 14A of the display 14 (S33).

When the user finishes inputting characters and then presses the enter key 13F (S34: YES), the CPU 1 writes the input character data into the body BD of the e-mail EM as a message (S35). Thereafter, the comment input processing is finished and the CPU 1 returns to the broadcasting processing.

In S34, when the user has not yet pressed the enter key 13F (S34: NO), the CPU 1 waits for any character to be input in S32.

In S32, when no characters are input even though the comment key 13H is pressed (S32: NO), the CPU 1 determines whether a time-out period has passed since the comment key 13H is pressed (S36).

When the CPU 1 determines that the time-out period of approximately 30 seconds has passed (S36: YES), the comment inputting processing is not performed, and the broadcast processing is instead performed again.

In S36, when it is not determined that the time-out period has passed (S36: NO), the CPU 1 waits for any characters to be input by the user in S32.

In S30, when the comment key 13H is not pressed (S30: NO), the CPU 1 continues the broadcasting processing, without executing the comment input processing as an interrupt.

With the CPU 1 executing a subroutine of the interrupt of the above-described comment input processing, the input of the comment, to be written into the body BD of the e-mail EM, is allowed at any time before the step S9 in the flowchart shown in FIG. 4.

With the facsimile apparatus A having the above-described constructions and that performs the above-described operations, the image data of the facsimile data attached to the e-mail EM can be broadcast to each of e-mail address, with the information as to whether the recipient of the e-mail EM has to respond to the facsimile data, being indicated according to the selected command. In addition, other broadcast e-mail addresses are, or are not, disclosed according to the selected command. While meeting various sender's needs, such as indicating response required/not required, and the disclosure/non-disclosure of other broadcast e-mail addresses, the facsimile apparatus A can broadcast the facsimile data, with the functions unique to the e-mail being effectively used.

With the simple operation of just pressing the comment key 13H, the input mode is changed to the character input mode where the comment can be input. The input comment can be viewed as a message written into the body BD of the e-mail EM, as the recipient reads out the facsimile data.

Alternative methods to correlate each of the e-mail addresses with a command in the facsimile apparatus A will be described with reference to FIGS. 5B to 5D. It is to be noted that the reference numerals in FIG. 5A, used for the components of the control panel 13 and the display 14, designate the same or corresponding components shown in FIGS. 5B to 5D.

Figure 5B:
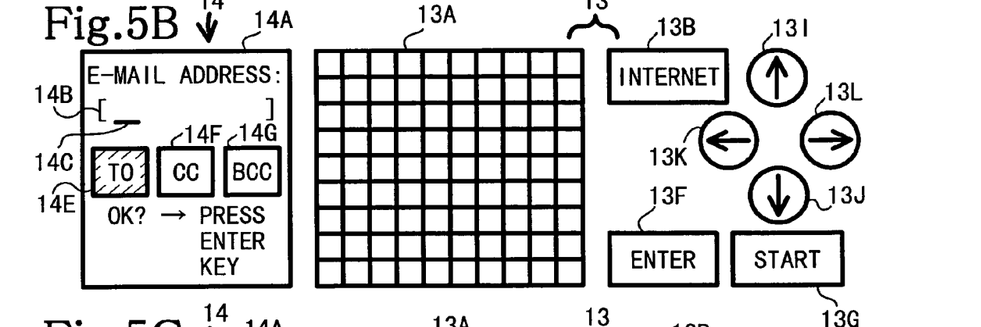
FIG. 5B is a detailed schematic of the control panel and the display of the facsimile apparatus according to one embodiment of the invention.
Figure 5C:
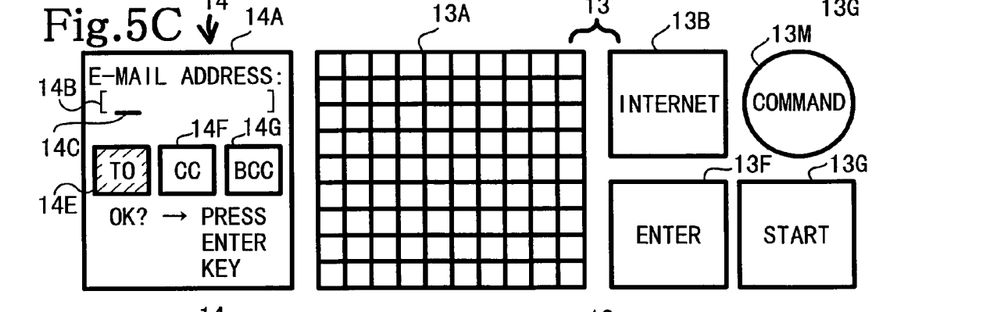
FIG. 5C is a detailed schematic of the control panel and the display of the facsimile apparatus according to one embodiment of the invention.

In FIG. 5B, the control panel 13 includes a character input key 13A, an Internet key 13B, an enter key 13F, a start key 13G, and up, down, left, and right arrow keys 13I, 13J, 13K and 13L. The comment key 13H, such as shown in FIG. 5A, is omitted in FIG. 5B, to simplify the illustration even though it is provided on the control panel 13.

The display 14 includes an LCD 14A. In the LCD 14A, an e-mail address indication area 14B and a cursor 14C can be shown. Further, in the LCD 14A, "TO", "CC", and "BCC" command indication areas 14E, 14F, and 14G can be shown.

In this embodiment, an e-mail address input by the character input key 13A is shown in the e-mail address indication area 14B, similar to the embodiment described above with reference to FIG. 5A. That is, an e-mail address can be input similar to the above-described embodiment. However, the commands are selected in a different manner. As shown in FIG. 5B, the "TO" command indication area 14E is initially highlighted. When the user presses the enter key 13F with the "TO" command indication area 14E highlighted, the "TO" command is selected. To select the "CC" or "BCC" command, the "CC" or "BCC" command indication area 14F or 14G is highlighted by the user's pressing the left or right arrow key 13K or 13L. Then, the enter key 13F is pressed. The up and down arrow keys 13I and 13J are used to move up and down between the command indication areas, 14E, 14F, 14G and the e-mail address indication area 14B, such as when any character in the input e-mail address is corrected.

One embodiment of the invention will be explained with reference to FIG. 5C. In FIG. 5C, the control panel 13 includes a character input key 13A, an Internet key 13B, an enter key 13F, a start key 13G, and a command dial 13M that can turn clockwise and counterclockwise. The comment key 13H, such as shown in FIG. 5A, is omitted in FIG. 5C to simplify the illustration, even though it is provided on the control panel 13.

The display 14 includes an LCD 14A. In the LCD 14A, an e-mail address indication area 14B and a cursor 14C can be shown. Further, in the LCD 14A, "TO", "CC", and "BCC" command indication areas 14E, 14F, and 14G can be shown.

In this embodiment, an e-mail address input by the character input key 13A is shown in the e-mail address indication area 14B, similar to the embodiment described above with reference to FIG. 5A. That is, an e-mail address can be input similar to the above-described embodiment. However, the commands are selected in the different manner. As shown in FIG. 5C, the "TO" command indication area 14E is initially highlighted. When the user presses the enter key 13F with the "TO" command indication area 14E highlighted, the "TO" command is selected. To select the "CC" or "BCC" command, the "CC" or "BCC" command indication area 14F or 14G is highlighted by the user's turning the command dial 13M clockwise or counterclockwise. Then, the enter key 13F is pressed. In this embodiment, a toggle switch may alternatively be used for the command dial 13M. In this case, the construction such that the highlight changes between the command indication areas 14E, 14F, and 14G every time the toggle switch is pressed, may be employed.

Figure 5D:
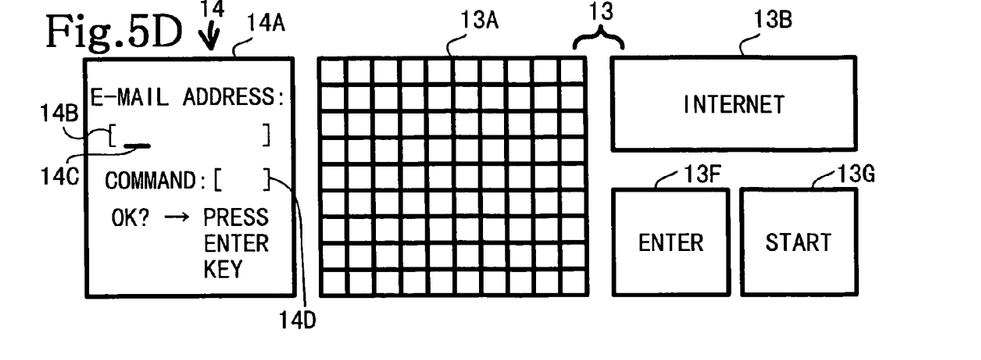
FIG. 5D is a detailed schematic of the control panel and the display of the facsimile apparatus according to one embodiment of the invention.

With reference to FIG. 5D, one embodiment of the invention will be explained. In FIG. 5D, the control panel 13 includes a character input key 13A, an Internet key 13B, an enter key 13F, and a start key 13G. The comment key 13H, such as shown in FIG. 5A, is omitted in FIG. 5C to simplify the illustration, even though it is provided on the control panel 13.

The display 14 includes an LCD 14A, similar to that shown in FIG. 5A. In the LCD 14A, an e-mail address indication area 14B and a cursor 14C can be shown. Further, in the LCD 14A, a command indication area 14D can be shown.

In this embodiment, an e-mail address input by the character input key 13A is shown in the e-mail address indication area 14B, similar to the embodiment described above with reference to FIG. 5A. That is, an e-mail address can be input similar to the above-described embodiment. However, in this embodiment, a command of "TO", "CC", or "BCC" is directly input in the indication area 14B, using the character input key 13A.

Apart from the various commands explained in the above embodiments, a control command, such that facsimile data, is colored for each e-mail address according to the priority, may be written in the header HD of the e-mail EM. When such construction is employed, an access point must be supported to transmit the e-mail EM according to the above-described control command.

While the invention has been described with reference to the embodiments, it is to be understood that the invention is not restricted to the particular forms shown in the foregoing embodiments. Various modifications and alternations can be made thereto without departing from the scope of the invention.

What is claimed is:

1. A facsimile apparatus that transmits facsimile data by attaching facsimile data to electronic mail (e-mail) for use with an information network, comprising:
   a recipient's information inputting device that inputs information of a recipient to whom the e-mail is transmitted;
   a notation inputting device that inputs notation that informs whether the e-mail is addressed to the recipient or the e-mail is transmitted as a carbon copy, and that correlates the notation to the recipient's information;
   a transmission device that transmits the facsimile data by attaching the facsimile data to the e-mail, based on the recipient's information input by the recipient's information inputting device and the notation input by the notation inputting device;
   an interruption device that interrupts processing of the e-mail prior to completion of generating the e-mail; and
   a writing device that writes information into a body of the e-mail during the interruption of the processing.

2. The facsimile apparatus according to claim 1, wherein the recipient's information inputting device inputs pieces of the recipient's information for one piece of the e-mail.

3. The facsimile apparatus according to claim 2, wherein the notation inputting device inputs a plurality of notations and correlates each of the plurality of notations to each of the pieces of the recipient's information input by the recipient's information inputting device.

4. The facsimile apparatus according to claim 1, further comprising:
   a reading device that reads, from an original document, the facsimile data to be attached to the e-mail and then transmitted.

5. The facsimile apparatus according to claim 1, further comprising:
   a facsimile data transmission/reception device that only transmits/receives the facsimile data by a public line.

6. A facsimile apparatus that broadcasts, to a plurality of recipients, facsimile data by attaching the facsimile data to electronic mail (e-mail) for use with an information network, comprising:
   a recipient's information inputting device that inputs pieces of recipient's information for one piece of the e-mail to be transmitted;
   a disclosure information inputting device that inputs disclosure information as to whether or not disclosure of other broadcast recipients is required, according to the pieces of the recipient's information input by the recipient's information inputting device, and that correlates the disclosure information to the recipient's information;
   a transmission device that transmits the facsimile data to be broadcast by attaching the facsimile data to the e-mail, based on the pieces of the recipient's information input by the recipient's information inputting device and the disclosure information input by the disclosure information inputting device;
   an interruption device that interrupts processing of the e-mail prior to completion of generating the e-mail; and
   a writing device that writes information into a body of the e-mail during the interruption of the processing.

7. The facsimile apparatus according to claim 6, further comprising:
   a reading device that reads, from an original document, the facsimile data to be attached to the e-mail and then transmitted.

8. The facsimile apparatus according to claim 6, further comprising:
   a facsimile data transmission/reception device that only transmits/receives the facsimile data by a public line.

9. The facsimile apparatus according to claim 6, wherein a notation of a blind carbon copy is correlated to a recipient's information of a recipient whose disclosure is not required.

10. A facsimile apparatus that broadcasts, to a plurality of recipients, facsimile data by attaching the facsimile data to electronic mail (e-mail) for use with an information network, comprising:
    a recipient's information inputting device that inputs pieces of recipient's information for one piece of the e-mail to be transmitted;
    a notation inputting device that inputs notation that informs whether the e-mail is addressed to the recipient or the e-mail is transmitted as a carbon copy, and that correlates the notation to the recipient's information;
    a disclosure information inputting device that inputs disclosure information, as to whether or not disclosure of other broadcast recipients is required, according to the pieces of the recipient's information input by the recipient's information inputting device, and that correlates the disclosure information to the recipient's information;
    a transmission device that transmits the facsimile data to be broadcast by attaching the facsimile data to the e-mail, based on the pieces of the recipient's information input by the recipient's information inputting device, the notation input by the notation inputting device and the disclosure information input by the disclosure information inputting device;
    an interruption device that interrupts processing of the e-mail prior to completion of generating the e-mail; and
    a writing device that writes information into a body of the e-mail during the interruption of the processing.

11. The facsimile apparatus according to claim 10, further comprising:
    a facsimile data transmission/reception device that only transmits/receives the facsimile data by a public line.

12. The facsimile apparatus according to claim 10, wherein the notation inputting device and the disclosure information inputting device are a common device, and the notation and the disclosure information are common information.

13. The facsimile apparatus according to claim 10, wherein a notation of a blind carbon copy is correlated to a recipient's information of a recipient whose disclosure is not required.

14. A computer readable storage medium storing a program, for controlling a facsimile apparatus that transmits facsimile data by attaching the facsimile data to electronic mail (e-mail), for use with an information network, comprising:

a recipient's information inputting program for inputting information of a recipient to whom the e-mail is transmitted;

a notation inputting program for inputting notation that informs whether the e-mail is addressed to the recipient or the e-mail is transmitted as a carbon copy, and for correlating the notation to the recipient's information;

a disclosure information inputting program for inputting disclosure information as to whether or not disclosure of other recipients is required, according to the recipient's information input by the recipient's information inputting program, and for correlating the disclosure information to the recipient's information;

a transmission program for transmitting the facsimile data by attaching the facsimile data to the e-mail, based on the recipient's information input by the recipient's information inputting program, the notation input by notation inputting program and the disclosure information input by the disclosure information input program;

an interruption program that interrupts processing of the e-mail prior to completion of generating the e-mail; and a writing program that writes information into a body of the e-mail during the interruption of the processing.

15. The facsimile apparatus according to claim 14, wherein a notation of a blind carbon copy is correlated to a recipient's information of a recipient whose disclosure is not required.

16. A computer readable storage medium storing a program, for controlling a facsimile apparatus that broadcasts to a plurality of recipients facsimile data by attaching the facsimile data to electronic mail (e-mail), for use with an information network, comprising:

a recipient's information inputting program for inputting pieces of recipient's information for one piece of the e-mail to be transmitted;

a disclosure information inputting program for inputting disclosure information as to whether or not disclosure of other broadcast recipients is required, according to the pieces of the recipient's information input by the recipient's information inputting program, and for correlating the disclosure information to the recipient's information;

a transmission program for transmitting the facsimile data by attaching the facsimile data to the e-mail based on the recipient's information input by the recipient's information inputting program and the disclosure information input by the disclosure information inputting program;

an interruption program that interrupts processing of the e-mail prior to completion of generating the e-mail; and a writing program that writes information into a body of the e-mail during the interruption of the processor.

17. The facsimile apparatus according to claim 16, wherein a notation of a blind carbon copy is correlated to a recipient's information of a recipient whose disclosure is not required.

18. A computer readable storage medium storing a program, for controlling a facsimile apparatus that transmits facsimile data by attaching the facsimile data to electronic mail (e-mail), for use with an information network, comprising:

a recipient's information inputting program for inputting information of a recipient to whom the e-mail is transmitted;

a notation inputting program for inputting notation that informs whether the e-mail is addressed to the recipient or the e-mail is transmitted as a carbon copy, and for correlating the notation to the recipient's information;

a transmission program for transmitting the facsimile data by attaching the facsimile data to the e-mail, based on the recipient's information input by the recipient's information inputting program and the notation input by the notation inputting program;

an interruption program that interrupts processing of the e-mail prior to completion of generating the e-mail; and a writing program that writes information into a body of the e-mail during the interruption of the processing.

* * * * *